United States Patent [19]

Priaroggia

[11] Patent Number: 4,767,173
[45] Date of Patent: Aug. 30, 1988

[54] SUBMARINE TELECOMMUNICATION LINE WITH OPTICAL FIBERS

[75] Inventor: Paolo G. Priaroggia, Milan, Italy

[73] Assignee: Societa' Cavi Pirelli S.p.A., Milan, Italy

[21] Appl. No.: 875,305

[22] Filed: Jun. 17, 1986

[30] Foreign Application Priority Data

Jun. 26, 1985 [IT] Italy ................................ 21300 A/85

[51] Int. Cl.⁴ ................................................ G02B 6/44
[52] U.S. Cl. .................................. 350/96.20; 174/70 S; 350/96.23
[58] Field of Search .................... 174/70 S; 350/96.20, 350/96.23

[56] References Cited

U.S. PATENT DOCUMENTS

| | | | |
|---|---|---|---|
| 3,920,932 | 11/1975 | Roza | 174/70 S X |
| 4,217,028 | 8/1980 | Reh et al. | 350/96.23 X |
| 4,253,729 | 3/1981 | Rocton | 350/96.20 |
| 4,653,846 | 3/1987 | Yamazaki et al. | 350/96.23 X |
| 4,717,232 | 1/1988 | Priaroggia | 350/96.20 |
| 4,722,588 | 2/1988 | Priaroggia | 350/96.23 X |
| 4,722,590 | 2/1988 | Thomas | 350/96.23 |

OTHER PUBLICATIONS

Massey, "Copper", *Comprehensive Inorganic Chemistry*, Pergamon Press, Ltd., 1973, vol. 3, p. 12.

*Primary Examiner*—John Lee
*Attorney, Agent, or Firm*—Brooks Haidt Haffner & Delahunty

[57] ABSTRACT

A hollow cylindrical, watertight casing housing optoelectronic repeater components, having optical fibers extending therefrom, and having a bore in which a tension resisting rope is received and is insulated from the wall of the bore. The casing is enclosed by a watertight, tubular box which has a pair of cylindrical bodies extending therefrom, one at each end of the box. Each cylindrical body has a centrally disposed length of rope surrounded by polymeric material in which optical fibers are embedded, and the polymeric material is surrounded by a metallic sheath. The optical fibers of the cylindrical bodies are connected within the box to the optical fibers extending from the casing. The lengths of rope of the bodies are mechanically connected at one end respectively to opposite ends of the rope in the bore and at the opposite end respectively to ropes of submarine optical fiber cables having similar ropes, optical fibers and a metallic sheath. The optical fibers of the bodies are connected to the optical fibers of the cables, and the sheaths of the bodies are connected to the sheaths of the cables. Any otherwise empty spaces within the box are filled with a substantially incompressible fluid.

12 Claims, 1 Drawing Sheet

U.S. Patent    Aug. 30, 1988    4,767,173
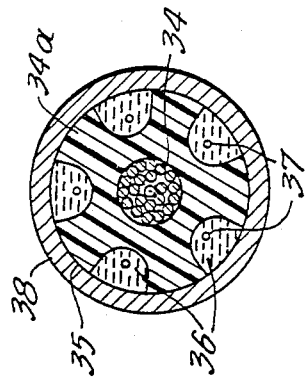
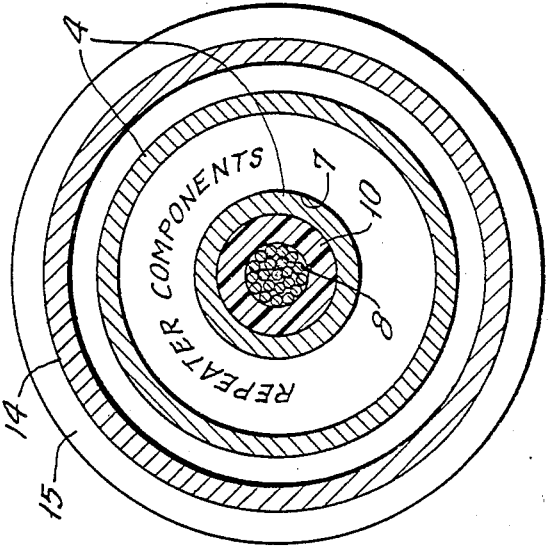
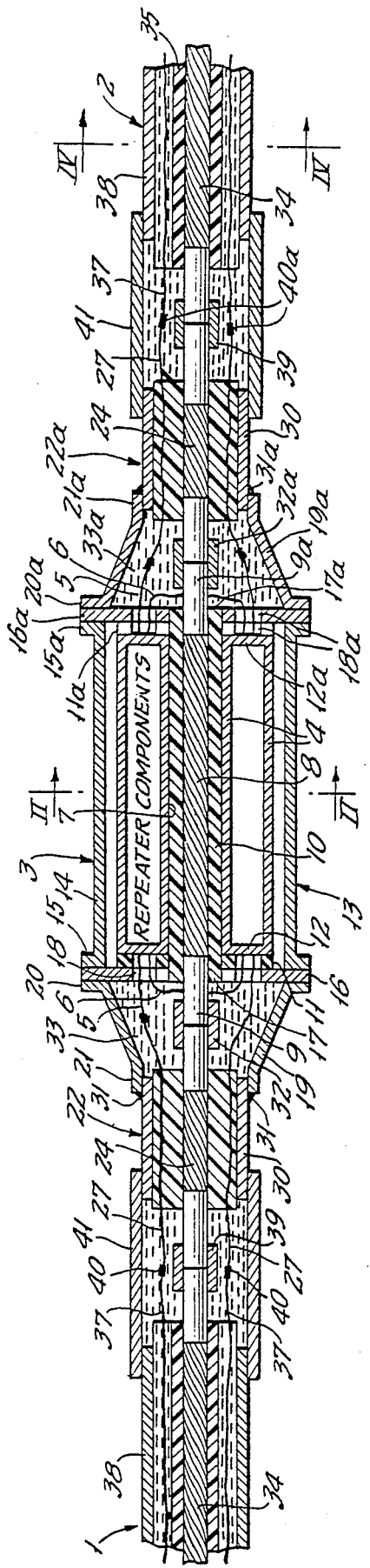
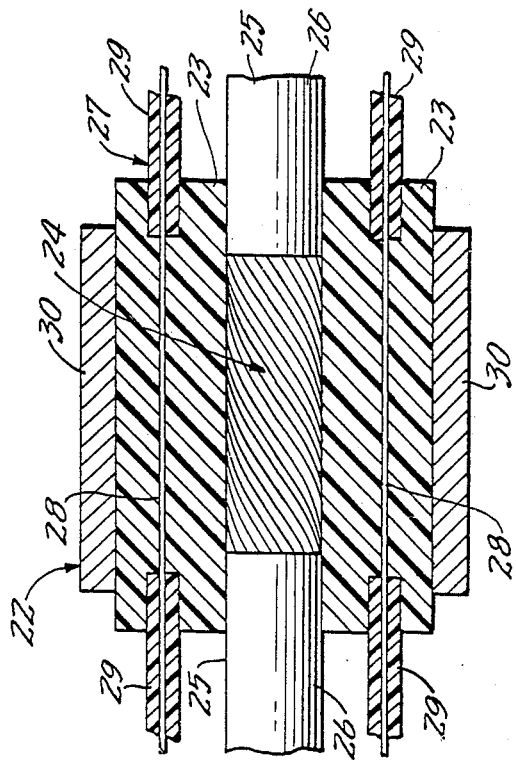

SUBMARINE TELECOMMUNICATION LINE WITH OPTICAL FIBERS

The present invention refers to a submarine signal transmission line for optical fiber telecommunications which incorporates optoelectronic repeaters for the signals which are transmitted.

The transmission lines of the type to which the invention relates comprise at least two optical fiber cables which are disposed in series, and an optoelectronic repeater interposed between them and connected to the facing extremities of the two cables.

In the known submarine lines, the problem exists of preventing even minimum traces of water from reaching and damaging the optoelectronic component parts of the repeater.

At present, the optoelectronic component parts of the repeater, are enclosed inside a watertight casing from which the ends of the optical fibers and the ends of the electrical conductors extend. To the walls of the casing, the sheaths of the two cables and their mechanically resistant armorings are connected in a sealed manner. The sealing connection zone, between the sheaths of the cables and the casing of the repeater has enclosing means for both the connections between the optical fibers of the cables and the extremities of the optical fibers, as well as the connections between the electrical conductors which are incorporated inside the optical fiber cables and the ends of the electrical conductors of the repeaters.

This known solution does not assure that the component parts of the optoelectronic repeater are protected against humidity even when the sealing connection between the sheaths of the cables and the watertight casing of the repeater is effectuated perfectly.

In fact, as time passes, should even minimum cracks occur in the sheaths of the cables, which cracks could permit the entry of traces of water into the cable, said water could reach and damage the component parts of the repeater by migrating along the cables and penetrating into the watertight casing through the ends of the optical fibers and of the conductors extending from it whenever there are defects in the sealing in correspondence of such ends. Moreover, in the known submarine lines, the connection of the optoelectronic repeater to the extremities of the cables, is a complex procedure which involves a relatively long time.

In fact, connections must be effectuated between the optical fibers of the cables and those of the repeaters and between the electrical conductors incorporated in the cable and the electrical conductors of the repeaters, a sealing connection must be effectuated between the watertight casing which encloses the repeater's component parts and the sheaths of the cables, and the mechanical connections must be effectuated between the armorings of the cables and the casing of the repeater.

All these operations are often carried out aboard a ship, from which the laying of the submarine line is carried out, and not in a factory where good use can be made of all those devices which prevent humidity from coming into contact with the component parts of the repeater.

The relatively high amount of time required for connecting the line and the conditions under which this operation is effectuated increase the risks of damage, resulting from humidity, to the component parts of the optoelectronic reeaters.

One object of the present invention is a submarine optical fiber line for telecommunications which is without the above-described drawbacks.

More specifically, an object of the present invention is a submarine, optical fiber line for telecommunications, incorporating optoelectronic repeaters which, besides being easily and rapidly connected, also provides an optimum protection against humidity reaching the component parts of the optoelectronic repeaters.

In accordance with the present invention, a submarine line for optical fiber telecommunications which comprises an optoelectronic repeater for the signals transmitted and which is inserted in-between two submarine optical fiber cables, each cable being provided with a watertight sheath and being of the type wherein the mechanically resistant armoring is a rope which occupies the radially innermost portion of the cable, is characterized by the fact that the optoelectronic repeater comprises a box which is substantially tubular and cylindrical bodies made of polymeric material provided with metallic sheath on their exteriors which closes the apertures at the box ends in a sealing manner. Lengths of optical fibers for connecting with the optical fibers of the cables and with the optical fibers of the repeaters are embedded in the cylindrical bodies. A first rope length has one extremity secured to the cable rope and the other extremity secured to a mechanically resistant element secures to the box, the box enclosing a watertight casing containing the component parts of the optoelectronic repeater. The metallic sheaths of said cylindrical bodies are connected, in a watertight way, to the sheaths of the cables.

Other objects and advantages of the present invention will be apparent from the following detailed description of the presently preferred embodiments thereof, which description should be considered in conjunction with the accompanying drawings in which:

FIG. 1 is an axial cross-section of a length of a submarine line, according to the invention, in the zone where an optoelectronic repeater is present;

FIG. 2 is a transverse cross-section taken along the line II—II of FIG. 1;

FIG. 3 is an enlarged axial section of a component part of the line shown in FIG. 1; and FIG. 4 is a transverse cross-section of one of the cables in the line and is taken along the line IV—IV of FIG. 1.

A submarine line for optical fiber telecommunications according to the invention comprises at least two submarine optical fiber cables disposed in series with an optoelectronic repeater for the signals transmitted. The cables, forming a line according to the invention, are of the type wherein the mechanically resistant armoring is a compact anti-torsional rope disposed in the radially innermost zone of the cables, the spaces between the component wires or threads being filled up with a substantially incompressible fluid. Examples of such cables are shown and described in my copending U.S. applications Ser. Nos. 831,998 and 831,650, filed Apr. 20, 1986 and respectively entitled "Pressure Resistant Optical Fiber Cable" and "Pressure Resistant Submarine Optical Fiber Cable" (now U.S. Pat. Nos. 4,722,589 and 4,725,121, respectively).

In this specification, the term "substantially incompressible fluid" refers to liquid substances, which, preferably, are viscous and may have a high viscosity. Gases are excluded from this term. Examples of substantially incompressible fluids are silicone grease, petroleum-jelly and similar materials.

In FIG. 1, there is illustrated an axial cross-section of a length of the line of the invention at the portion thereof which includes the optoelectronic repeater.

As is shown in FIG. 1, the line comprises two optical fiber cables 1 and 2, which will be further described hereinafter, and an optoelectronic repeater 3 for the signals transmitted.

The optoelectronic repeater 3, shown in cross-section in FIG. 2, comprises a watertight casing 4 inside which the component parts (not shown) of the repeater are enclosed.

The extremities of the optical fibers 5 and of the conductors 6, for feeding the optoelectronic component parts, extend from the watertight casing 4 and are connected thereto in a watertight manner by conventional seals. For example, the said extremities pass through small metal tubes (not shown) which are welded to the casing 4 and which are filled up with a polymeric thermosetting material, such as, for example, an epoxy resin.

The electrical circuit connected to the line for feeling the optoelectronic repeaters, will be described hereinafter.

The watertight casing 4 has a through-cavity 7 at its longitudinal axis. Inside the through-cavity 7, there is housed a length of compact anti-torsional rope 8 having ends which extend from the casing 4.

The length of rope 8, which will also be called the "first rope-length" has the spaces between the component wires or threads, filled up with a substantially incompressible fluid and includes an electrical conductor. For example, the electrical conductor may be a copper wire wound on the length of rope 8. Moreover, the wires or threads forming the first rope-length are made of a material having a high mechanical resistance to tension forces, such as, for example, steel, aromatic polyamids, carbon fibers, and the like.

A layer 10 of electrically insulating plastic material, for example, a polyolefin layer, covers the outer surface of the rope 8 except for its extremities 9 and 9a. Also, washer 11 and 11a, made from a similar insulating material, are applied to the bases 12 and 12a of the watertight casing 4.

All the elements described above with reference to the FIGS. 1 and 2, are enclosed inside a sealed, metal box 13. The metal box 13 comprises a tubular metal body 14 having, at its extremities, flanges 15 and 15a which surround the watertight casing 4, and metal discs 16 and 16a which contact, and preferably, adhere, to the insulating material washers 11 and 11a.

The metal discs 16 and 16a are provided with central holes 17 and 17a which allows them to be fitted, through force, upon the plastic layer 10 which covers most of the length of the rope 8. Also, the discs 16 and 16a and the washers 11 and 11a are provided with apertures 18 and 18a for allowing the passage of the extremities of the optical fibers 5 and of the electric conductors 6 which extend from the watertight casing 4.

The metal box 13 has two lids 19 and 19a having a frustoconical form, open at both their ends, said lids being provided with flanges 20 and 20a and 21 and 21a respectively, at their larger and smaller frusto-conical ends.

The flanges 20 and 20a of the lids 19 and 19a are secured by conventional means, such as bolts and nuts, to the flanges 15 and 15a of the tubular body 14 in a sealed manner, and the outer edges of discs 16 and 16a are interposed between and engage the flanges 15, 15a, 20 and 20a.

The weight of said metallic box 13, of the lids 19 and 19a of the watertight casing 4, and of the component parts of the optoelectronic repeaters rests entirely upon the first rope length 8 due to the forced fit between discs 16 and 16a and the plastic layer 10. Therefore, the assembly of the rope length 8 with the plastic layer 10 and the discs 16 and 16a constitutes a mechanically resistant element secured to the box 13.

The openings at the smaller ends of the lids 19 and 19a, which are also the end openings of the metal box 13, are closed in a sealing manner by cylindrical bodies 22 and 22a which are shown in enlarged scale and in axial cross-section in FIG. 3.

Each cylindrical body 22 and 22a comprises a cylindrical mass 23, with an axial bore, made from a thermosetting polymeric material, for example, an epoxy resin or a cross-linked polymer, for example, a cross-linked elastomeric polymer.

The radially innermost portion of the cylindrical mass 23 encloses a portion 24 of the compact, anti-torsional length of rope 8 which will be called the "second rope length" having extremities 25 extending from the mass 23. An electrical conductor is incorporated in the second length of rope 24. For example, the conductor may be a copper wire wound on said second rope-length 24.

Moreover, the wires or threads which form the second rope-length 24 are made of a material having a high mechanical resistance to tension forces, such as, steel, aromatic polyamids, carbon fibers, and the like.

At least, for the entire lengths 25 of the second rope-lengths 24 which extend from the mass 23 of polymeric material and preferably, for a length embedded in the polymeric material of the mass 23, the spaces in-between the wires or threads forming the second rope-length 24 are, preferably, filled up with a metallic material 26, for example, tin, or metal alloys such as, for example, solder alloys. In general, the metallic material has a melting point temperature which does not exceed 1000° C.

For all the remaining part of the second rope-length 24, the spaces between the wires are filled up with a substantially incompressible fluid.

In addition, in the cylindrical plastic mass 23, a plurality of lengths of optical fibers 27 are embedded, such fibers 27 being disposed parallel to the axis of the cylindrical body 22 and with their extremities extending from the polymeric mass 23.

Each optical fiber 27 has its central portion 28 secured, either by or without adhesives of the known type, to the polymeric material of the mass 23. Preferably, said central portion 28 is without any whatsoever plastic protective coating. The extremities 29 of the optical fibers, are provided with an adherent type of protection.

The radially outermost surface of the cylindrical plastic mass 23 is covered by a metalllic sheath 30. Moreover, the metallic sheath 30 is secured by adhesive means, of any per se known type, to the polymeric material of the mass 23.

As previously stated, and as can be seen in FIG. 1, the cylindrical bodies 22 and 22a close the openings of the box 13. In fact, the flanges 21 and 21a of the frusto-conical lids 19 and 19a of the box 13, engage the metallic sheaths 30 and are welded to it in a sealed manner at points 31 and 31a.

One extremity 25 of each of the second rope lengths 24 is disposed, end-to-end, with an extremity 9 and 9a of the first rope-length 8 and are secured, by means of squeezing clamps 32 and 32a, through a welding, or the like. The clamps 32 and 32a carry out a mechanical connection between the rope-lengths 8 and 24, and an electrical connection between the conductors incorporated in them.

Between the cylindrical bodies 22 and 22a, the frusto-conical lids 19 and 19a and the discs 16 and 16a, chambers 33 and 33a - are formed. These chambers enclose the connections between the extremities of the optical fibers 5 (which extend from the watertight casing 4) as well as the optical fibers 27 (of the cylindrical body 22) and the connections between the ends of the electrical conductors 6 (which extend from the watertight casing 4) and the conductor incorporated in the second rope-length 24.

The chamber 33 is filled with a substantially incompressible fluid which fills all spaces existing between the watertight casing 4 and metal box 13.

The cylindrical bodies 22 and 22a are also connected in a sealed manner, as will later be described, to the extremities of the cables 1 and 2 adjacent thereto.

As mentioned hereinbefore, the cables 1 and 2 are of the type wherein the mechanically resistant armoring is formed by a compact anti-torsional rope which occupies the radially innermost portion of the cables themselves.

In FIG. 4, there is shown, solely by way of example, the cross-section of one form of cable which is adapted for realizing a submarine line according to the invention, but it is to be understood that, also included in the scope of the present invention, are submarine lines having optical fiber cables of any other structure provided that their mechanically resistant armoring is formed by a rope occupying the radially innermost portion of the cables themselves.

In the particular embodiment illustrated in FIGS. 1 and 4, the cables comprise a compact anti-torsional rope 34 which is formed by wires having a high mechanical resistance to tension forces, such as, steel, aromatic polyamids, carbon fibers, and the like. The spaces in-between the wires which form the rope 34 are filled with a substantially incompressible fluid.

Moreover, an electrical conductor formed by at least one wire made of a material having a high conductivity such as copper, can be incorporated, for example, by winding it around the rope 34 or including it within the rope 34.

The rope 34, is surrounded by a plastic layer 34a which is adhered to the rope 34, and the rope 34 and the layer 34a constitute the core 35 of the cable. On the outer surface of the core 35, there are present a plurality of helically disposed grooves 36 in which the optical fibers 37 are loosely received. The grooves 36 are completely filled with a substantially incompressible fluid.

A plastic or metallic sheath 38 encloses the core 35 and closes the grooves 36.

As was previously stated, the cylindrical bodies 22 and 22a are connected to the extremities of the cables 1 and 2. Said extremities of the cables 1 and 2 are prepared in advance for rendering the extremities of the optical fibers 37 and of the ropes 34 individually accessible for the connecting operation.

The extremity of each rope 34 is disposed end-to-end with a extremity 25 of each second rope-length 24 and is secured to the latter by a squeezing-clamp 39. Apart from realizing a mechanical continuity, this connection also provides an electrical connection between the conductors incorporated in the rope 34 and in the second rope-length 24.

Moreover, the optical fibers 37 of the cables 1 and 2 are connected (at 40 and 40a) to the lengths of optical fibers 27 of the cylindrical bodies 22 ad 22a.

Furthermore, a tubular metallic piece 41 has its one extremity superimposed over the sheath 38 of the cables, and sealingly fixed i.e. through welding—if metallic, or, through adhesives—if plastic. The other extremity of the tubular metallic piece 41 is superimposed over the metallic sheath 30 of the cylindrical body 22, and it is sealingly fixed to it—by means of welding. The entire space, comprised in-between the tubular metallic piece 41 and the extremities of the cables, is filled up with an incompressible fluid.

As previously stated, a line according to the invention is provided with an electrical circuit for feeding the optoelectronic repeaters of the signals transmitted by the optical fibers.

A conductor of the electrical circuit is constituted by the assembly of the conductors incorporated in the ropes 34 of the cables 1 and 2, and in the rope-lengths 8 and 24 disposed in series one with the other and by the connecting clamps between such ropes and such rope-lengths.

In general, the return conductor is the sea.

As an alternative, if the sheaths of the cables 1 and 2 are metallic, then the return conductor can be the assembly of the sheaths of the cables, the metallic sheath 30 of the cylindrical bodies 22 and 22a and the box 13 of the repeater, all these elements being covered at their exposed outer surfaces by a protective plastic layer. Otherwise, the return conductor can be constituted by said assembly and by the sea disposed in parallel to one another.

Moreover, if the ropes 34 of the cables 1 and 2 and the rope-lengths 8 and 24, do not have any conductors incorporated thereon or therein, then, the conductor of the electrical circuit for feeding the optoelectronic repeaters is formed by the assembly comprising the metallic sheath 38 of the cables 1 and 2, the metallic sheath 30 of the cylindrical bodies 22 and 22a and the box 13 of the repeater, all covered outwardly by an insulating plastic layer, whereas the return conductor is the sea.

The line of the invention can also be covered by the customary anti-corrosive protection layers which are usually adopted in the field of submarine lines.

In embodiments of a line according to the invention and previously described, there was described a particular mechanically resistant element made solid with the box 13 for effectuating the mechanical connection with the rope-lengths 24 of the cylindrical bodies 22. Even though the particular mechanically resistant element described is the preferred one, other alternative embodiments will be apparent to those skilled in the art.

According to an alternative embodiment, the mechanically resistant element comprises a tubular extension extending from each of the discs 16 and 16a in correspondence of the holes 17 and 17a, in substitution for the rope-lengths 8. Such tubular extensions would be secured to the extremities 25 of the rope-lengths 24 of the cylindrical bodies 22 and 22a.

From the previously described embodiments and from the following considerations, it will be understood that, with the present invention, the objects of the invention can be achieved.

In a submarine line for optical fiber telecommunications, according to the invention, the component parts of the optoelectronic repeaters are protected against humidity, by the presence of a double barrier.

In fact, the component parts of the optoelectronic repeaters, are enclosed inside a watertight casing and which, in its turn, is inside a sealed metal box 13 with every space inbetween these elements, filled up with a substantially incompressible fluid, such as, for example, a silicone grease which, in se, has the property of impeding any migration of humidity.

Moreover, the metal box 13 is closed, in a watertight way in correspondence of the openings facing the cables 1 and 2, by means of the cylindrical bodies 22 and 22a which, due to the special structure they are endowed with, form an impenetrable barrier against any spread of humidity. In fact, even if, with the passage of time, cracks in the cable sheaths 38 should form which are such as to allow water to penetrate and spread along the cable, no water would ever be able to overcome said barrier formed by the cylindrical bodies 22 and 22a. The object for this is the fact that each element forming the cylindrical bodies 22 and 22a is watertight in se or else, has been made watertight, such as by filling the space, between the component wires of the extremities 25 with a metallic material. Moreover, all the component parts of the cylindrical bodies 22 and 22a are tightly connected, and consequently, all the possible ways for the penetration of water are eliminated.

For providing the maximum assurance against the dangers that even a minimum trace of water could cause to the component parts of the optoelectronic repeaters, there is the fact that the assembly consisting of the cylindrical bodies 22 and 22a, the metal box 13 for the repeaters, with all the elements housed therein, can be prepared in the factory itself before installation thereof. Hence, there can be assembled in the factory all the devices which assure the absence of humidity inside the box 13.

The assembly which possesses the quality of being absolutely watertight, eliminates any risks of being damaged as a result of humidity reaching the component parts of the repeaters during the assembling of the line because, in having been previously prepared inside the factory, no internal interventions are necessary during the connection of the repeater to the cables in the field.

The assembling of the repeater to the cables can be rapidly carried out since it simply consists in connecting said assembly to the optical fiber cables.

Although preferred embodiments of the present invention have been described and illustrated, it will be apparent to those skilled in the art that various modifications may be made without departing from the principles of the invention.

The embodiments of the invention in which an exclusive property or privelege is claimed are defined as follows:

1. A submarine, optical fiber, telecommunication line comprising:

a pair of optical fiber cables, each cable comprising a central rope for withstanding the tension forces applied to the cable, a watertight sheath around said rope and a plurality of optical fibers intermediate said rope and said sheath;

a watertight casing enclosing optoelectronic repeater components and having optical fibers extending therefrom in watertight relation thereto, said casing having a through cavity at its longitudinal axis;

a first length of tension-resistant rope in said through cavity and having opposite ends extending outwardly of said watertight casing;

a tubular box surrounding said watertight casing;

a pair of cylindrical bodies, each of said bodies comprising a second length of tension-resistant rope of stranded filaments surrounded by polymeric material in sealed relation thereto which, in turn, is surrounded by a metallic sheath in sealed relation to said polymeric material, at least one end portion of said second length of rope having any spaces therein filled with a metallic material and a plurality of optical fibers intermediate said second length of rope and said sheath and embedded in said polymeric material, the last-mentioned said optical fibers extending the length of and out of said body, one said body being disposed at one end of said box and having the optical fibers extending out of said one said body connected at one end to the optical fibers of one of said cables and connected at their opposite ends to the optical fibers extending from said watertight casing and the other said body being disposed at the other end of said box and having the optical fibers extending out of said other said body connected at one end to the optical fibers of the other of said cables and connected at their other ends to the optical fibers extending from said watertight casing and each said body being watertight;

first mechanical means mechanically connecting said sheath of said one said body to said box and to said sheath of said one of said cables in watertight relation thereto;

second mechanical means mechanically connecting one end of said second length of rope of said one said body to one end of said first length of rope and mechanically connecting the other end of the last-mentioned said second length of rope to said rope of said one of said cables;

third mechanical means mechanically connecting said sheath of said other said body to said box and to said sheath of the said other of said cables in watertight relation thereto; and fourth mechanical means mechanically connecting one end of said length of rope to said other said body to the other end of said first length of rope and mechanically connecting the other end of the last-mentioned said second length of rope to said rope of said other of said cables;

whereby each optical fiber cable has one of said cylindrical bodies between it and the box, the sheath of each optical fiber cable is mechanically connected to said box by said sheath of one of said cylindrical bodies and the central rope of one said cable is mechanically connected to the central rope of the other said cable by the first length of rope and the second lengths of rope of said pair of cylindrical bodies whereby water tightness of said tubular box is assured even with the presence of water in the optical fiber cables.

2. A submarine, optical fiber, telecommunication line as set forth in claim 1 wherein said second length of rope of each said cylindrical body has at least one end portion extending outwardly from at least one of the ends of its associated cylindrical body, wherein any spaces within at least said end portion of each said second length of rope is filled with a metallic material and any spaces within said length of rope which are free of said metallic material are filled with a substantially incompressible fluid.

3. A submarine, optical fiber, telecommunication line as set forth in claim 2 wherein said metallic material is selected from the group consisting of metals and metal alloys having a melting point not greater than 1000° C.

4. A submarine, optical fiber, telecommunication line as set forth in claim 1 wherein the portions of the last-mentioned said optical fibers within said polymeric material are without a protective plastic layer thereon and intermediate the optical fibers and said polymeric material and the portions of the last-mentioned said optical fibers extending out said cylindrical bodies have a protective layer thereon.

5. A submarine, optical fiber, telecommunication line as set forth in claim 1 wherein said rope in said through cavity of said watertight casing is electrically insulated from the wall of said through cavity.

6. A submarine, optical fiber, telecommunication line as set forth in claim 1 wherein said first and third mechanical means comprise tubes connected to the sheaths of said cylindrical bodies and to the sheaths of said cables in watertight relation.

7. A submarine, optical fiber, telecommunication line as set forth in claim 6 wherein any spaces within said tubes are filled with a substantially incompressible fluid.

8. An optoelectronic repeater assembly for connection to the ends of a pair of submarine cables, said assembly comprising:

a watertight casing enclosing optoelectronic repeater components and having optical fibers extending therefrom in watertight relation thereto, said casing having a through cavity at its longitudinal axis;

a watertight tubular box surrounding said watertight casing, said box having a first cylindrical body extending from a first portion thereof and adapted to be connected to one of said ends of said pair of cables and a second cylindrical body extending from a second portion thereof spaced from said first portion thereof and adapted to be connected to the other of said ends of said pair of cables;

said first cylindrical body and said second cylindrical body each comprising a second length of tension resisting rope of stranded filaments surrounded by polymeric material in sealed relation thereto which, in turn, is surrounded by a metallic sheath in sealed relation to said polymeric material, at least an end portion of said second length of rope having any spaces therein filled with a water impervious material and a plurality of optical fibers intermediate said sheath and said second length of rope and embedded in said polymeric material, the last-mentioned said optical fibers extending the length of and out of said body, the last-mentioned said optical fibers being connected at one end and internally of said box to said optical fibers extending from said watertight casing; and tension resisting means in said through cavity and mechanically connected to said second length of rope of said first cylindrical body and to said second length of rope of said second cylindrical body for transferring tension forces applied to said second length of rope of said first cylindrical body to said second length of rope of said second cylindrical body.

9. An optoelectronic repeater assembly as set forth in claim 8 wherein said second length of rope of said first cylindrical body has at least one portion extending outwardly from said first cylindrical body and said second length of rope of said second cylindrical body has at least one portion extending outwardly from said second cylindrical body.

10. An optoelectronic repeater assembly as set forth in claim 9 wherein each said portion of said second length of rope has any spaces therein filled with a metallic material and wherein other portions of each said second length of rope are filled with a substantially incompressible fluid.

11. An optoelectronic repeater assembly as set forth in claim 10 wherein said metallic material is selected from the group consisting of metals and metal alloys having a melting point not greater than 1000° C.

12. An optoelectronic repeater assembly as set forth in claim 8 wherein any otherwise empty spaces within said box are filled with a substantially incompressible fluid.

* * * * *